United States Patent
Huang et al.

(10) Patent No.: US 11,117,567 B2
(45) Date of Patent: Sep. 14, 2021

(54) REAL TIME TRAJECTORY OPTIMIZATION FOR HYBRID ENERGY MANAGEMENT UTILIZING CONNECTED INFORMATION TECHNOLOGIES

(71) Applicants: Toyota Motor Engineering & Manufacturing North America, Inc., Plano, TX (US); The Regents of the University of Michigan, Ann Arbor, MI (US)

(72) Inventors: Mike X. Huang, Ann Arbor, MI (US); Yushi Shibaike, Canton, MI (US); Shengqi Zhang, Houston, TX (US); Di Chen, Ann Arbor, MI (US); Anna G Stefanopoulou, Ann Arbor, MI (US)

(73) Assignees: Toyota Motor Engineering & Manufacturing North America, Inc., Plano, TX (US); The Regents of the University of Michigan, Ann Arbor, MI (US)

( * ) Notice: Subject to any disclaimer, the term of this patent is extended or adjusted under 35 U.S.C. 154(b) by 482 days.

(21) Appl. No.: 16/019,512

(22) Filed: Jun. 26, 2018

(65) Prior Publication Data
US 2019/0389451 A1    Dec. 26, 2019

(51) Int. Cl.
*B60W 20/12* (2016.01)
*G05D 1/02* (2020.01)
(Continued)

(52) U.S. Cl.
CPC ............ *B60W 20/12* (2016.01); *B60W 20/11* (2016.01); *B60W 50/0097* (2013.01);
(Continued)

(58) Field of Classification Search
CPC ...... B60W 20/12; B60W 20/00; B60W 20/13; B60W 20/10; B60W 20/20;
(Continued)

(56) References Cited

U.S. PATENT DOCUMENTS

| | | | | |
|---|---|---|---|---|
| 7,954,579 B2 * | 6/2011 | Rodriguez | ........ | B60W 30/1882 180/65.265 |
| 8,095,290 B2 * | 1/2012 | Smyth | ................. | F02D 41/3035 701/102 |

(Continued)

FOREIGN PATENT DOCUMENTS

| | | |
|---|---|---|
| JP | 2008279829 | 11/2008 |
| JP | 2014151760 | 8/2014 |

OTHER PUBLICATIONS

Gunter Heppeler et al., Fuel Efficiency Analysis for Simultaneous Optimization of the Velocity Trajectory and the Energy Management in Hybrid Electric Vehicles, 2014.
(Continued)

*Primary Examiner* — Luis A Martinez Borrero
(74) *Attorney, Agent, or Firm* — Sheppard, Mullin, Richter & Hampton LLP; Hector A. Agdeppa; Daniel N. Yannuzzi

(57) ABSTRACT

The disclosure is directed to solving a full trajectory optimization problem in real-time for a hybrid electric vehicle (HEV) such that future driving conditions and energy usage may be fully considered in determining optimal engine energy usage and battery energy usage in real-time during a trip. An electronic control unit of the HEV may be configured to: receive route information for a route to be driven by the HEV; and after receiving the route information, iterating the operations of: measuring a current state of charge (SOC) of the battery; using at least the measured SOC and an initial co-state value stored in a memory, performing a process to iteratively update the co-state value to obtain an updated
(Continued)

co-state value; using at least the updated co-state value, computing an updated control value; and applying the updated control value to control a usage of the battery and the internal combustion engine.

20 Claims, 17 Drawing Sheets

(51) Int. Cl.
  *B60W 20/11* (2016.01)
  *B60W 50/00* (2006.01)
(52) U.S. Cl.
  CPC ..... *G05D 1/0217* (2013.01); *B60W 2510/244* (2013.01); *B60W 2710/087* (2013.01); *G05D 2201/0213* (2013.01)
(58) Field of Classification Search
  CPC ............ B60W 2710/08; B60W 20/11; B60W 50/0097; G05D 1/0217; G05D 1/0276; G05D 1/0011; B60L 50/16; B60L 58/12; B60L 2240/421; B60L 50/60
  See application file for complete search history.

(56) References Cited

U.S. PATENT DOCUMENTS

| | | | |
|---|---|---|---|
| 8,190,318 B2 | 5/2012 | Li | |
| 8,190,319 B2* | 5/2012 | Syed | B60W 10/06 701/22 |
| 8,386,169 B2* | 2/2013 | Nguyen | G01C 21/3469 701/423 |
| 8,543,270 B2* | 9/2013 | Kelty | H01M 16/00 701/22 |
| 8,615,342 B2* | 12/2013 | Suganuma | B60W 10/04 701/22 |
| 8,731,752 B2* | 5/2014 | Yu | B60L 58/12 701/22 |
| 9,050,969 B2* | 6/2015 | Yu | B60W 10/08 |
| 9,090,255 B2* | 7/2015 | Gupta | B60W 10/26 |
| 9,102,318 B2* | 8/2015 | Yu | B60L 58/12 |
| 9,187,085 B1* | 11/2015 | Nallapa | B60W 20/13 |
| 9,637,111 B2* | 5/2017 | Nikovski | B60W 10/06 |
| 9,695,760 B2* | 7/2017 | Dufford | B60W 30/188 |
| 10,569,728 B2* | 2/2020 | Martin | F16D 65/827 |
| 2003/0009269 A1* | 1/2003 | Graf | B60L 50/16 701/22 |
| 2009/0198398 A1* | 8/2009 | Yamada | B60W 20/12 701/22 |
| 2010/0102776 A1 | 4/2010 | Uchida | |
| 2010/0138093 A1 | 6/2010 | Oku | |
| 2011/0066308 A1 | 3/2011 | Yang | |
| 2011/0276209 A1* | 11/2011 | Suganuma | B60W 10/06 701/22 |
| 2012/0010767 A1* | 1/2012 | Phillips | B60W 10/06 701/22 |
| 2012/0035795 A1* | 2/2012 | Yu | B60W 50/0097 701/22 |
| 2013/0131900 A1* | 5/2013 | Yu | B60L 15/2045 701/22 |
| 2014/0018985 A1* | 1/2014 | Gupta | B60W 10/26 701/22 |
| 2014/0163789 A1* | 6/2014 | Yu | B60W 10/06 701/22 |
| 2014/0228168 A1* | 8/2014 | Kaufman | B60K 6/48 477/5 |
| 2015/0097512 A1* | 4/2015 | Li | B60L 58/13 320/101 |
| 2015/0120107 A1* | 4/2015 | Yu | B60W 20/00 701/22 |
| 2015/0232097 A1* | 8/2015 | Luther | B61L 3/006 701/123 |
| 2015/0275787 A1* | 10/2015 | Dufford | B60W 30/188 701/102 |
| 2015/0307082 A1* | 10/2015 | Nallapa | B60L 53/64 701/22 |
| 2016/0075341 A1* | 3/2016 | Arvidsson | G01S 19/42 701/22 |
| 2016/0264124 A1 | 9/2016 | Hotta | |
| 2016/0272078 A1* | 9/2016 | Kalyanaraman | G01C 21/3469 |
| 2016/0362096 A1* | 12/2016 | Nikovski | B60W 10/08 |
| 2017/0028978 A1* | 2/2017 | Dunlap | B60W 20/13 |
| 2017/0101026 A1* | 4/2017 | Lucea | B60L 58/12 |
| 2017/0129359 A1* | 5/2017 | Dunlap | B60L 1/02 |
| 2017/0302218 A1* | 10/2017 | Janik | B63B 21/50 |
| 2018/0370520 A1* | 12/2018 | Liu | B60W 10/08 |
| 2019/0256078 A1* | 8/2019 | Lavertu | B60K 6/52 |
| 2019/0291665 A1* | 9/2019 | Martin | B60H 1/3205 |
| 2020/0001858 A1* | 1/2020 | Bennett | B60W 30/192 |

OTHER PUBLICATIONS

Onori et al., On Adaptive-ECMS Strategies for Hybrid Electric Vehicles, IFP Energies Nouvelle—RHEVE 2011, Dec. 6-7, 2011.

Sun et al, the Role of Velocity FOrecasting in Adaptive—ECMS for Hybrid Electric Vehicles, the 7th International Conference on Applied Energy—ICAE2015, 2015.

Keulen et al, Velocity Trajectory Optimization in Hybrid Electric Trucks,, 2008.

Sivertsson et al., "Adaptive Control of a Hybrid Powertrain with Map-based ECMS," Proceedings of the 18h World congress, IFAC, Milano, Italy, 2011.

Onori et al., "Adaptive equivalent consumption minimization strategy for hybrid electric vehicles," Proceedings of the ASME 2010 Dynamic Systems and Control Conference, Cambridge, Mass., USA, Sep. 12-15, 2010.

Musardo et al., "A-ECMS: an adaptive algorithm for hybrid electric vehicle energy management," Proceedings of the 44th IEEE Conference on Decision and Control, Seville, Spain, Dec. 12-15, 2005.

Patent Cooperation Treaty, International Search Report for PCT/US2019/035641, dated Oct. 18, 2019, pp. 1-5.

\* cited by examiner

|  | best case [%] | real world est. [%] | length [km] |
|---|---|---|---|
| route10b | 2.2082 | 0.9206 | 18.5 |
| route10 | 2.9016 | 1.4521 | 18.5 |
| route11 | 2.9584 | 2.4061 | 31 |
| route12 | 3.3146 | 2.1304 | 13.7 |
| route13 | 3.32063 | 2.6091 | 19.5 |
| route14 | 1.9496 | 1.0139 | 22.5 |
| route15 | 2.70195 | 2.6114 | 35 |
| route16 | 2.9502 | 2.9037 | 18 |
| route17 | 3.0281 | 2.9133 | 21 |
| route18 | 2.9594 | 2.15485 | 18 |
| dist. norm'd avg | 2.803899652 | 2.155739128 | |

FIG. 7E

REAL TIME TRAJECTORY OPTIMIZATION FOR HYBRID ENERGY MANAGEMENT UTILIZING CONNECTED INFORMATION TECHNOLOGIES

STATEMENT OF GOVERNMENT RIGHTS

This invention was made with Government support under award DE-AR0000837 awarded by the Office of Advanced Research Projects Agency-Energy (ARPA-E), United States Department of Energy (DOE). The government has certain rights in the invention.

This invention was made with government support under award DE-AR0000837 awarded by the Advanced Research Projects Agency-Energy, United States Department of Energy. The government has certain rights in the invention.

DESCRIPTION OF RELATED ART

Hybrid electric vehicles (HEVs) have become increasingly popular among consumers concerned with their environmental impact and with increasing fuel economy. HEVs generally utilize an engine, e.g., an internal combustion engine (ICE), along with an electric motor, which can also operate as a generator to provide energy to a battery that powers the electric motor. HEVs can use an engine clutch that connects/disconnects the engine to/from a drivetrain. The drivetrain can include a transmission coupled to the electric motor for transmitting power from the engine, electric motor, or both. A HEV powertrain may include the engine, electric motor, and drivetrain.

HEVs may utilize various methods to minimize fuel consumption and battery energy usage over the course of a trip to maximize energy utilization. Such methods may take into account driving conditions (e.g., speed, acceleration, etc.) to decide on an optimal ratio of engine usage to battery usage of an HEV powertrain, sometimes referred to as a "power split."

BRIEF SUMMARY OF THE DISCLOSURE

The disclosure is directed to solving a full trajectory optimization problem in real-time for a HEV such that future driving conditions and energy usage may be fully considered in determining optimal engine energy usage and battery energy usage in real-time during a trip.

In one embodiment, a hybrid electric vehicle includes: an internal combustion engine; a battery; an electric motor operatively coupled to the battery; and an electronic control unit to optimize engine energy usage and battery usage in real-time during a trip. The control unit may be configured to: receive route information for a route to be driven by the hybrid electric vehicle; and after receiving the route information, iterating the operations of: measuring a current state of charge (SOC) of the battery; using at least the measured SOC and an initial co-state value stored in a memory, performing a process to iteratively update the co-state value to obtain an updated co-state value; using at least the updated co-state value, computing an updated control value; and applying the updated control value to control a usage of the battery and the internal combustion engine.

In implementations, performing the process to iteratively update the co-state value to obtain the updated co-state value, includes iteratively performing the operations of: using at least a current SOC, a current co-state value stored in a memory, and a control value stored in a memory, selecting a new control value; storing the new control value in a memory; using at least the current SOC and the new control value stored in memory, calculating a SOC one time step ahead in the future; using at least the current SOC the new control value stored in memory, and a current co-state value, calculating a co-state value one time step ahead in the future; and setting the one time step ahead SOC and the one time step ahead co-state values as a current SOC and a current co-state value.

In implementations, selecting the new control value includes lowering a cost function of fuel consumption and battery SOC times the current co-state value. In implementations, performing the process to iteratively update the co-state value to obtain the updated co-state value, includes: after iteratively performing the operations of selecting, storing, calculating, calculating, and setting, performing the operations of: computing a difference between the current SOC with a minimum battery SOC; choosing a new co-state initial value to reduce the difference; and replacing the co-state initial value stored in a memory with the new co-state initial value.

In implementations, the operations of selecting, storing, calculating, calculating, and setting are iterated until the one time step ahead in the future reaches the expected end of the trip. In implementations, computing an updated control value includes using at least the measured SOC and updated co-state value to compute a control value that minimizes a sum of a current fuel consumption rate and a rate-of-change of battery SOC times the updated co-state value.

In implementations, the updated control value is to update the engine speed and the engine torque.

In implementations, the electronic control unit is to measure a velocity and power demand each time the SOC of the battery is measured.

In implementations, the electronic control unit is to measure traffic conditions prior to each time the co-state value is updated, where at least the measured current SOC, the initial co-state value stored in the memory, the measured velocity, the measured power demand, and the measured traffic conditions are used to update the co-state value.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7E is a table summarizing simulation results of a plurality of routes that were driven three times by a HEV implementing a power split control in accordance with the disclosure.

Figure 1A:
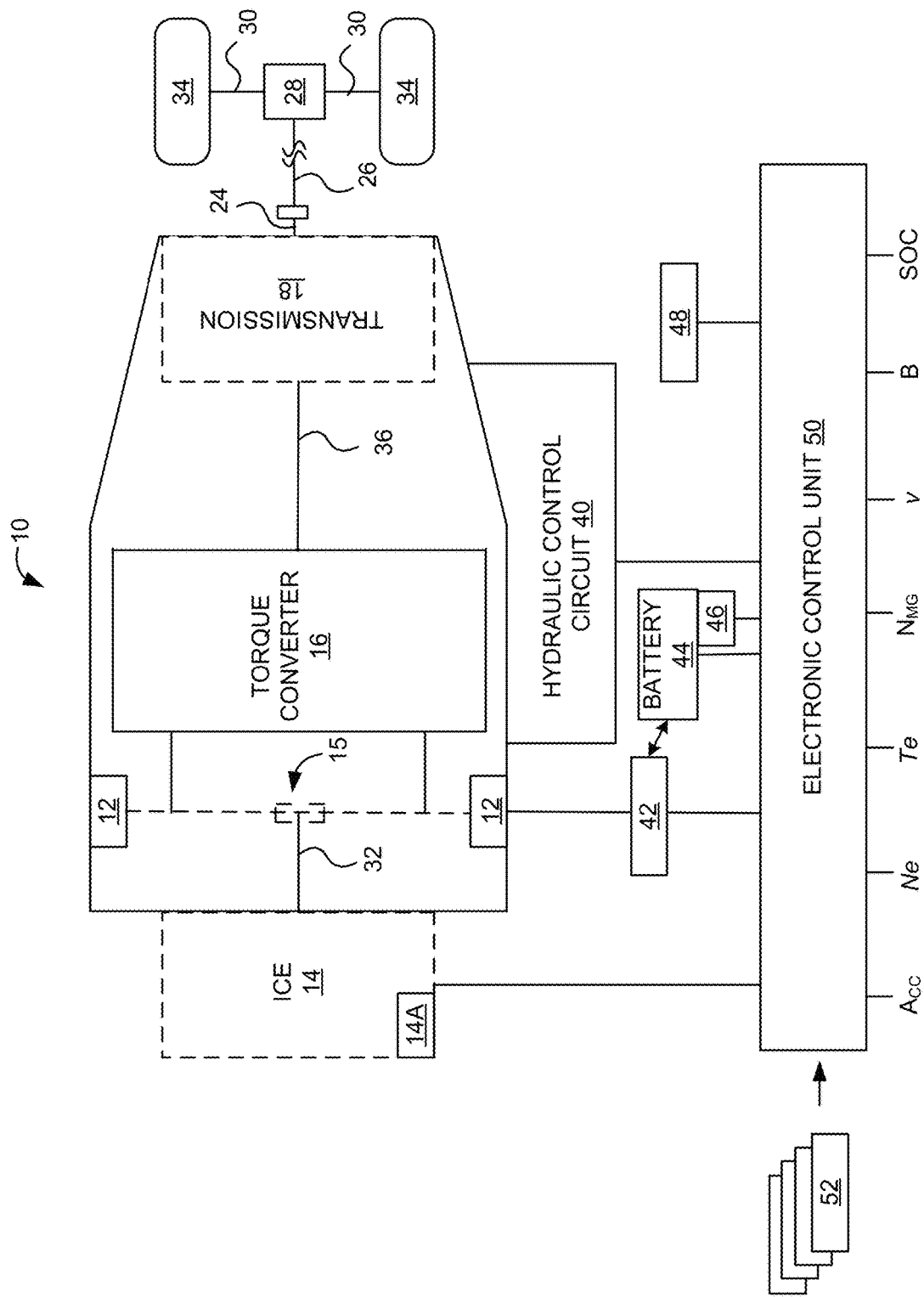
FIG. 1A is a schematic representation of a HEV in which power split control can be implemented in accordance with various embodiments of the present disclosure.

The figures are not exhaustive and do not limit the present disclosure to the precise form disclosed.

DETAILED DESCRIPTION

As used herein to describe power split control, the term "control variable" or "control value" generally refers to a choice of engine control parameters and/or motor control parameters for a HEV. For example, a control value may refer to a choice of engine speed and engine torque. As another example, a control value may refer to a choice of motor speed and motor torque.

As used herein, the term "co-state" generally refers to a relative cost of engine work and battery work in a HEV. A co-state may change over time because engine efficiencies and electrical efficiencies may change as a function of operating conditions.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Methods that minimize fuel consumption and battery energy usage over the course of a trip to maximize energy utilization often utilize some variation of an equivalent consumption minimization strategy (ECMS) that decides on a hybrid powertrain power split by, at each sampled time instant, minimizing a composite function of fuel consumption and "equivalent" battery energy usage. However, the fuel economy that results from using these strategies is extremely sensitive to the choice/calibration of a so-called "equivalence factor," which is a constant value used to provide "equivalent" battery usage to fuel consumption. The equivalence factor is used to tune, on average, how much fuel energy should be used and how much electrical battery energy be used such that at the end of a trip, the HEV has a battery SOC at a desired level. For example, in the cause of a plug-in HEV (PHEV), the desired final SOC is as low as possible. In the case of an HEV that does not plug in to the grid, the desired final SOC may be the beginning SOC. This equivalence factor may need to be chosen differently for each drive cycle/real-life drive scenario, and may change depending on a driving task. If the equivalence factor is "chosen correctly," then significant fuel economy gains may be made for HEVs, e.g., on the order of 3-10% depending on the vehicle and the drive scenario. However, if the equivalence factor is chosen for a specified driving scenario, and the scenario changes (e.g., an un-forecasted traffic congestion occurs), there may be no effective mechanism for recalibrating the equivalence factor during the trip.

The equivalence factor is conventionally used because it is thought that it is too computationally expensive to solve in real-time (e.g., while driving) an optimization problem that accounts for all future driving conditions in deciding the ratio of fuel consumption to battery energy to use at any given moment in time. As such, standard ECMS strategies may not consider any future energy usage in the optimization problem that is solved because they may not look far ahead enough into a route driven by a vehicle.

Implementations of the disclosure are directed to addressing these drawbacks with ECMS strategies. To this end, the disclosure is directed to solving a full trajectory optimization problem in real-time (e.g., while driving) such that future driving conditions and energy usage may be fully considered in determining optimal engine energy usage and battery energy usage in real-time during a trip.

As further described below, a real-time power split control may be implemented as part of an HEV power train to predict and optimize state and control trajectories all the way from a HEV's current location to the end of a commute (e.g., as specified by a mapped route). As such, unlike conventional ECMS strategies that rely on tuning an equivalence factor to "guess" future energy usage to determine a power split, implementations described herein may fully account for future conditions such as a sequence of future velocities and power demands (e.g., depending on traffic conditions and/or a mapped route) to determine an optimal power split automatically.

Before describing implementations of the power split control in further detail, it is instructive to describe an example HEV with which such implementations may be used. FIG. 1A is a schematic representation of an example HEV 10 in which power split control in accordance with various embodiments may be implemented. It should be noted that while FIG. 1A illustrates one example HEV having a particular power train configuration with which embodiments may be implemented, the technology described herein may implemented in HEV's having other power train configurations. For example, the technology disclosed herein may be implemented in HEVs having a one-motor system, a two-motor system, or a system with more than two motors. Additionally, the technology disclosed herein may be implemented in HEVs having a planetary gear set.

It should be noted that for clarity of the illustration, not all elements of HEV 10 are labeled with a reference numeral. For example, in some cases, only one of two or more elements or components of HEV 10 are labeled with a reference numeral. However, it can be assumed that the functionality and/or operation of similarly-illustrated elements or components are the same or similar, as would understood by those of ordinary skill in the art unless described otherwise. Moreover, aspects of HEV 10 may be described from the perspective of one/one set of elements or components. It can be assumed that secondary instances of those elements or components may operate the same or in a similar manner. It should also be noted that for ease of description and clarity of figures, not all components of a HEV have been illustrated, and that the figures and corresponding descriptions are not meant to be limiting. It should be further noted that a HEV may embody certain variations with respect to its elements or components, which are contemplated herein. For example HEV 10 may be configured with only a single motor.

FIG. 1A includes an example power train system of a HEV 10 that may include an engine 14 and a motor 12 as drive sources. Driving force generated by the engine 14 and the motor 12 can be transmitted to a pair of wheels 34 via a torque converter 16, an automatic transmission 18, a differential gear device 28, and a pair of axles 30. Each of the motor 12, the torque converter 16, and the automatic transmission 18 can be housed in a transmission case. The transmission case may be a splittable case made of aluminum die cast parts, for example, and fixed to a non-rotating member such as a vehicle body.

HEV 10 may be driven/powered with at least one of the engine 14 and the motor 12 as the drive source for travel. In other words, any one of a plurality of travel modes can be selectively established in the HEV 10. A first travel mode may be an engine-only travel mode that only uses the engine 14 as the drive source for travel. A second travel mode may be an EV travel mode that only uses the motor 12 as the drive source for travel. A third travel mode may be a hybrid travel mode that uses the engine 14 and the motor 12 as drive sources for travel. In the engine-only and hybrid travel modes, HEV 10 travels by using the driving force generated at least by engine 14 while a clutch 15 is engaged. In EV travel mode, HEV 10 travels by using the driving force generated by motor 12 while the engine 14 is stopped and clutch 15 is disengaged.

Engine 14 may be an internal combustion engine such as a gasoline engine or a diesel engine of an in-cylinder injection type, where fuel is injected directly into a combustion chamber. An output control device 14A is provided to control drive (output torque) of the engine 14. The output control device 14A may include a throttle actuator that controls opening and closing of an electronic throttle valve, a fuel injection device that controls fuel injection, an ignition device that controls ignition timing, and the like. The output control device 14A may execute output control of engine 14 according to a command control signal(s) supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A transmission input shaft 36 may transfer power from motor 12 and/or engine 14 to automatic transmission 18 to which a transmission output shaft 24 is attached. Connected to transmission output shaft 24 is a propeller shaft 26 coupled to differential gear device 28. Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches and brakes whose engagement is controlled by a hydraulic actuator. These hydraulic frictional engagement devices may be selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 may include a rotor and stator. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below may control inverter 42, adjust driving current supplied to or received from coils of the motor 12, and control driving of the motor 12. That is, output torque of the motor 12 can be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to a rotor of the motor 12 via clutch 15. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

HEV 10 may include an electronic control unit 50. Electronic control unit 50 may include a microcomputer that includes a CPU, a RAM, a ROM, an input-output interface, and the like. In electronic control unit 50, the CPU may utilize a temporary storage function of the RAM to perform signal processing according to a program stored in the ROM. Accordingly, the electronic control unit 50 may execute various kinds of control such as drive control of the engine 14, drive control of the motor 12, speed change control of the automatic transmission 18, engagement force control of the clutch 15, engagement control of the lock-up clutch 38, and the like. These control functions may be performed in a accordance with a power split control algorithm. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the HEV 10.

As shown in FIG. 1A, the electronic control unit 50 is supplied with various kinds of input signals detected by each sensor provided in the HEV 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and energy storage amount (remaining capacity, charged amount), e.g., battery SOC of battery 44. It should be noted that more signals indicative of other operational aspects of HEV 10 can be received by electronic control unit 50, e.g., a temperature of motor 12, coolant temperature of HEV 10, intake air amount of engine 14, etc.

Electronic control unit 50 can receive the input signals from various sensors 52 configured to sense relevant operational characteristics of HEV 10. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_e$ can be detected by an engine revolution speed sensor. The engine torque $T_e$ can be detected by an engine torque sensor. The motor rotational speed $N_{MG}$ can be detected by a motor rotational speed sensor. Vehicle speed v can be detected by a vehicle speed sensor. Battery SOC can be detected by an SOC sensor 46.

Another example of a sensor 52 may be a positioning or location sensor, such as a Global Positioning System (GPS) receiver that can provide location information corresponding to a location of HEV 10. Additionally, a sensor 52 that provides positioning or location information may provide traffic information for a current location of HEV 10 and an expected route of HEV 10. Additionally, electronic control unit 50 can receive input signals from a network interface device 48. Network interface device 48 may receive information such as map data, road conditions information, traffic information, and the like from one or more information service providers. For example, such information may be retrieved using vehicle-to-vehicle (V2V) communications, vehicle-to-infrastructure (V2I) communications, and/or vehicle-to-cloud (V2C) communications. Instead of relying solely on a GPS receiver, a location of HEV 10 may be determined from information received by network interface device 48.

Electronic control unit 50 can supply various output signals to one or more devices/components/elements provided in HEV 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15.

Figure 1B:
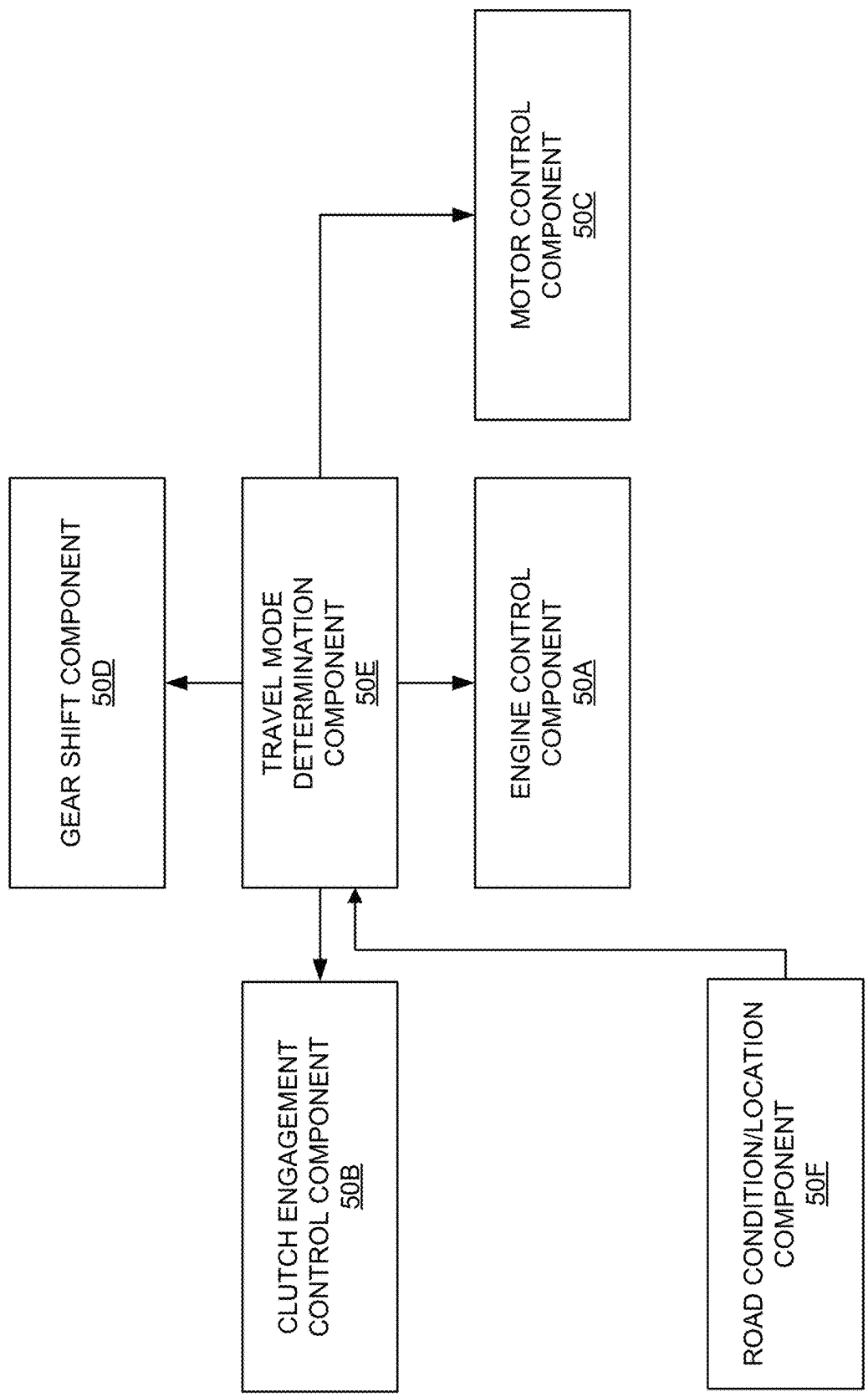
FIG. 1B is a functional block diagram illustrates component parts of a control function included in an electronic control unit of the HEV illustrated in FIG. 1A.

FIG. 1B is a functional block diagram that illustrates example parts of a control function that may be included in the electronic control unit 50. An engine control component 50A shown in FIG. 1B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved.

Engine control component 50A drives engine 14 in the engine-only and hybrid travel modes. For example, engine control component 50A may control when engine 14 is started, e.g., when switching from EV travel mode to the engine-only travel mode or the hybrid travel mode. This can occur when the HEV is transitioning from the EV travel mode to the hybrid travel mode. Likewise, engine control component 50A may control when engine 14 is shut off, e.g., when switching from engine-only or hybrid travel mode to EV travel mode.

To control engine 14, clutch 15 may be engaged (slip or complete engagement) so as to connect engine 14 to the power transmission path. This can be accomplished by clutch engagement control component 50B, described below. Engine control component 50A can instruct engine 14 to revolve, resulting in an engine revolution speed $N_E$, and the supply of fuel to engine 14 is started via the output control device 14A.

When HEV 10 is to be operated in EV mode, engine control component 50A outputs a control signal(s) to output control device 14A for stopping engine 14. Clutch 15 may be disengaged, and engine 14 is stopped. Moreover, output control device 14A may be commanded to stop the supply of fuel to engine 14.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing to battery 44 so as to generate negative motor torque such that HEV 10 decelerates.

A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode established in HEV 10 on the basis of present and future driving conditions. A determination can be made regarding which travel mode (EV, engine-only, hybrid) HEV is in on the basis of, e.g., vehicle velocity v, accelerator operation amount $A_{CC}$, battery SOC, brake operation amount B, power demand, engine revolution speed $N_e$, engine torque $T_e$, torque demand, etc. In embodiments, further described below, travel mode determination component may make a determination of which travel mode to utilize using a real-time power split algorithm, further described below.

A road conditions/location component 50F can make determinations regarding a location of HEV 10, as well as road conditions and/or traffic conditions forecasted for the trip. In one embodiment, road conditions/location component 50F may embody a navigation unit commonly found in many modern vehicles, hybrid or otherwise. Road conditions/location component 50F may receive information regarding road conditions from network interface device 48 and/or a GPS receiver, which may be one embodiment of a sensor 52. For example, the location of HEV at any point during its travel can be determined, e.g., by the GPS receiver, and this location can be correlated with road conditions information relevant to that location.

For example, upon startup or during operation of HEV 10, road conditions/location component 50F may determine a route to be traveled is known. The route may be known if an address, point of interest identifier, etc. is provided to a road conditions/location component 50F, for example, by a driver of HEV 10, via navigation system user interface. Road conditions/location component 50F may have or receive maps or map information indicative of the route to be traveled along with road conditions, e.g., any downhill grades present/expected along the route.

Figure 2:
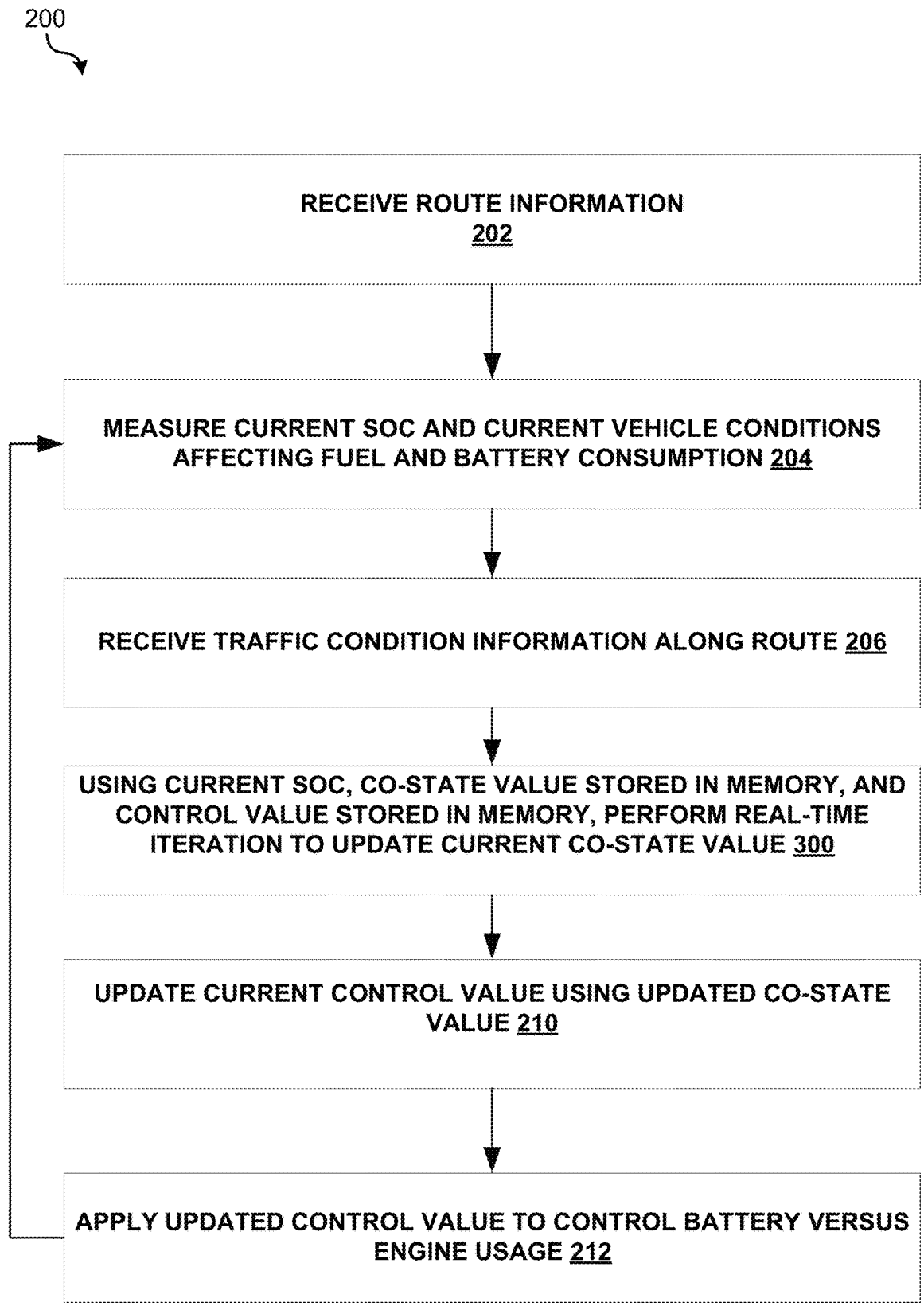
FIG. 2 is an operational flow diagram illustrating an example method that may be performed to control battery SOC, in accordance with implementations of the disclosure.

FIG. 2 is an operational flow diagram illustrating example method 200 of implementing a real-time power split control in a HEV, in accordance with implementations of the disclosure. In implementations, method 200 may be implemented by executing instructions stored in an electronic control unit 50 of a HEV. For example, one or more components 50A-50F may be used to realize method 200.

During implementation of method 200, a co-state variable, which represents a relative cost of engine work and battery work in the HEV, may be dynamically updated in response to present conditions and forecasted future conditions of the drive. Each time the co-state variable is updated, a control variable for controlling a power split of the HEV may be updated. For example, present conditions that may be used to update the co-state variable may include a battery SOC, a present HEV velocity, and present power demanded by the driver. Forecasted future conditions that may be used to update the co-state variable may include a sequence of future velocities and power demands for a remainder of the trip. These future velocities and power demands may be forecasted using a combination of a determined route and forecasted driving conditions for that determined route. For example, the forecasted driving conditions may be retrieved using vehicle-to-vehicle, vehicle-to-infrastructure, or, vehicle-to-cloud communications.

By virtue of dynamically updating the co-state variable (e.g., every second) to account for the fact that the relative cost of engine work and battery work in a HEV changes over time as engine efficiencies and electrical efficiencies change in response to driving conditions, energy consumption efficiency may be optimized. This contrasts with conventional ECMS that assume a constant equivalence factor.

Prior to implementing method 200, fuel energy consumption and battery energy consumption of the HEV may be modeled as a function of various parameters. For example, as further described below with reference to particular mathematical implementations, fuel energy consumption may be modeled as a function engine speed and engine torque. Additionally, battery energy consumption may be modeled as a function of one or more of SOC, velocity, torque demand, engine speed, and engine torque. The modeling of these functions may be determined prior to the manufacture of the HEV and may be embedded in electronic control unit 50 as a component of instructions for implementing a real-time power split.

At operation 202, route information is received. For example, a driver or other user of the HEV may enter route information into a navigation system of the HEV during a beginning of a drive. As another example, the route information may be received in response to the HEV recomputing a navigation route of the HEV. Subsequently, operations 204-212 may be iteratively repeated to control for a power split of the HEV while it navigates through the route.

At operation 204, a current SOC of the HEV's battery (e.g., current battery level) and other present vehicle conditions affecting fuel and battery consumption are measured. For example, in addition to the current SOC, a current velocity, and power demand of the vehicle may be measured.

At operation 206, current traffic information along the route may be received. For example, a network interface of the HEV may query one or more services for traffic conditions along the route. The received traffic information may be used to update a forecast of future velocities and/or power demands for a remainder of the route taken by the HEV.

At operation/method 300, using the measured SOC, a co-state value stored in memory, and a control value stored in memory, a real-time iteration may be performed to iteratively update a current co-state value. During each iteration of this iteration process, starting with the currently measured SOC and initial co-state value, the SOC, co-state value, and control value may be calculated one time step (e.g., one second) into the future taking into the account the HEV energy usage model equations and forecasted conditions. This iteration process may be repeated until the number of time steps match the expected end of the trip or until there is no longer any computation time available. A particular implementation of method 300 is further described below with reference to FIG. 3.

At operation 210, the current control value may be updated using the updated co-state value. In implementations, the current control value may be updated by using the measured SOC and updated co-state value to choose an updated control value that minimizes a sum of a current fuel consumption rate and a rate-of-change of battery SOC times the updated co-state value. For example, the derivative of the sum may be taken, and a control value chosen that is the zero or close to the zero of the derivative.

At operation 212, the updated control value may be applied to control present battery usage versus engine usage of the HEV. In some implementations, the updated control value may cause the HEV to change travel modes (e.g., to an EV mode, an engine-only mode, or hybrid mode). In some implementations, the updated control value may not cause a change in travel mode but may reduce battery usage while increasing engine usage or vice versa.

Thereafter operations 204-212 may iterate. For example operations 204-212 may iterate until the trip ends. In implementations, the rate of iteration of operations 204-212 may be preconfigured in a memory of electronic control unit 50. For example, in some implementations, operations 204-212 may be preconfigured to iterate every half second, every second, every two seconds, or during some other predetermined iteration time interval. The rate of iteration may be set depending on a desired accuracy of power split, computational power, and/or other relevant factors.

Figure 3:
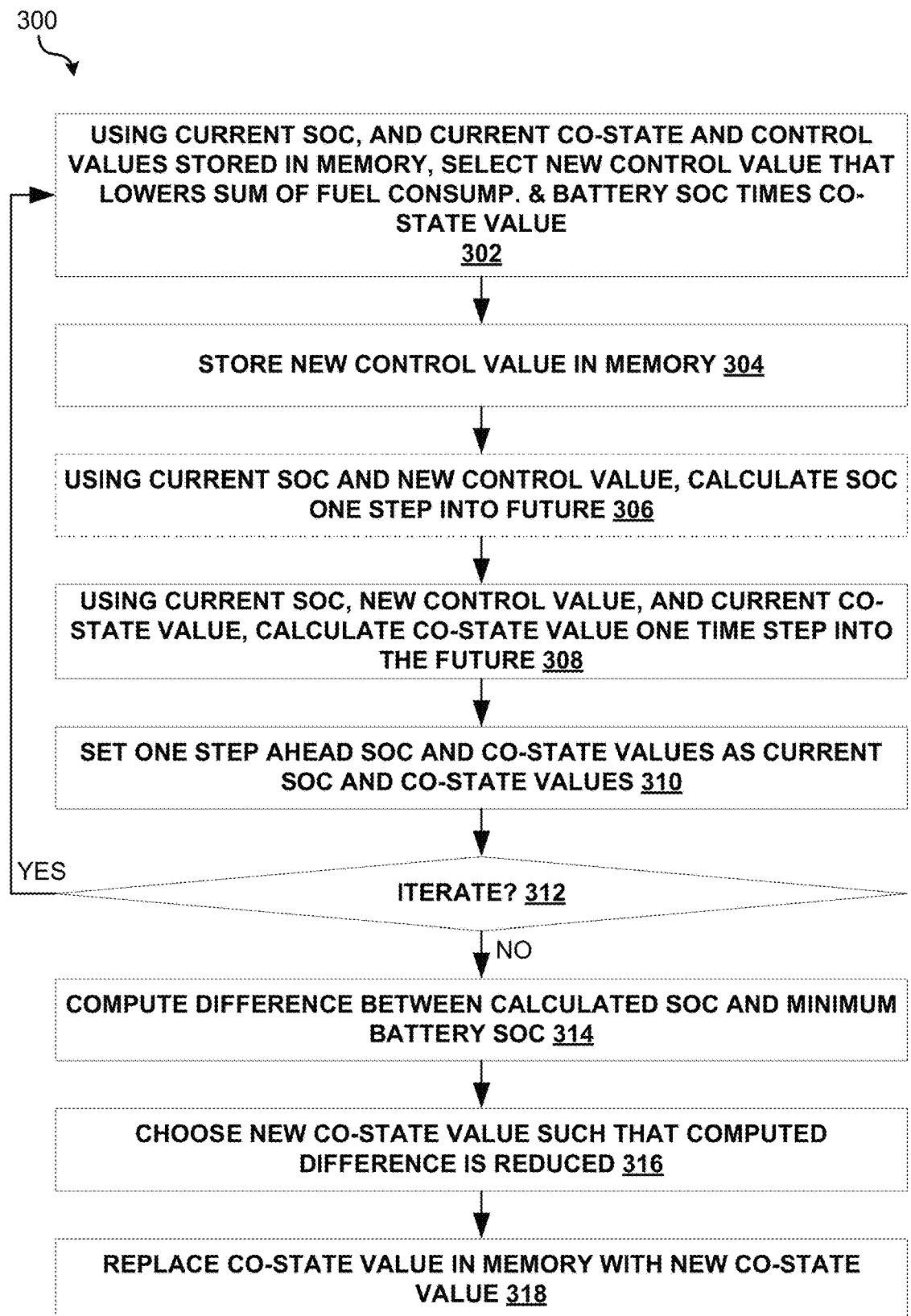
FIG. 3 is an operational flow diagram illustrating an example method of performing a real-time iteration to update a co-state value for power split control in a HEV, in accordance with particular implementations of the disclosure.

FIG. 3 is an operational flow diagram illustrating an example method 300 of performing a real-time iteration to update a co-state value for power split control in a HEV, in accordance with particular implementations of the disclosure. Prior to implementing method 300, a current SOC may be measured (e.g., as part of operation 204) and a co-state initial condition value may be read from memory and used as the current co-state value.

At operation 302, using the current SOC, the current co-state value, and a control value stored in the memory as a starting point, a new control value is selected that lowers a sum of fuel consumption and battery SOC times the co-state value. For example, a cost function (e.g., Hamiltonian) of fuel consumption and battery SOC times the co-state value may be lowered. In implementations, the cost function may be lowered by applying Newton's method.

At operation 304, the new control value is stored in a memory (e.g., a memory of the electronic control unit 50). In implementations, this may include discarding the previously stored value.

At operation 306, using the current SOC and new control value stored in memory, a SOC one time step into the future is calculated using HEV energy usage model equations. At operation 308, using the current SOC, new control value, and current co-state value, a co-state value one time step into the future is calculated using co-state equations. In implementations, the co-state equation may be obtained by differentiating the Hamiltonian (i.e., current fuel consumption plus rate-of-change of battery SOC times co-state) with respect to SOC. At operation 310, the one step ahead SOC and co-state values are set as the current SOC and co-state values.

At decision 312, it is determined whether operations 302-310 iterate. For example, operations 302-310 may iterate until the expected end of the trip or until there is no more computation time available to iterate until a next cycle of a power split. In cases where there is insufficient computation time available to iterate until the expected end of the trip, the iterations may be continued the next time that computation time is available. In such cases, operations 314-318 may be performed only after the expected end of the trip is reached in the iteration process.

At operation 314, a difference between the calculated SOC at the end of the trip and a minimum battery SOC is computed. At operation 316, a new co-state value is chosen such that the computed difference is reduced. For example, the difference may be reduced through Newton's method. At operation 318, a co-state value stored in memory is replaced with the new co-state value.

Mathematical Formulation

In implementations, real-time power split control for a HEV may be mathematically formulated as follows. The following optimization problem, expressed as Equation (1), may be solved or partially solved at each sample time t:

$$\min_{Ne,Te} \int_{\tau=t}^{\tau+T} \dot{m}(Ne, Te)d\tau \text{ s.t. } S\dot{O}C = f(SOC, Ne, Te, v, tp) \quad (1)$$

$$Ne, Te \in U = \{EV \text{ mode } (Ne, Te = 0) \cup (Ne, Te \text{ in engine on range})\}$$

$$SOC(T) = SOC_{final}^{target}$$

Here $\dot{m}(Ne,Te)$ is a fuel energy consumption rate expressed as a function of engine speed, Ne, and engine torque, Te. $S\dot{O}C$ is a rate of change of battery SOC expressed as a function of state of charge (SOC), Ne, Te, velocity, v, and torque demand, tp. T is made sufficiently large to cover an entire trip of the HEV.

Equation (1) gives a system of conditions that must be satisfied for optimality. Let x=SOC and u=[Ne,Te]$^T$, then a stationarity condition may be expressed as Equation (2):

$$\Delta tl(x_k^*, u_k^*) + \Delta tf(x_k^*, u_k^*)^T p_k^* \leq \Delta tl(x_k^*, u_k) + \Delta tf(x_k^*, u_k)^T p_k^*, \forall u_k \in U \quad (2)$$

Where p is co-state variable.
The state equation may be expressed as Equation (3):

$$x_{k+1}^* = x_k^* + \Delta tf(x_k^*, u_k^*) \quad (3)$$

The co-state equation is given by Equation (4):

$$p_{k+1}^* = p_k^* - \Delta tl_x(x_k^*, u_k^*) - \Delta tf_x(x_k^*, u_k^*)^T p_k^* \quad (4)$$

The two-point boundary conditions are given by Equations (5)-(6):

$$x_0^* = x(t) \quad (5)$$

$$x_N^* = x_{final}^{target} \quad (6)$$

Figure 4:
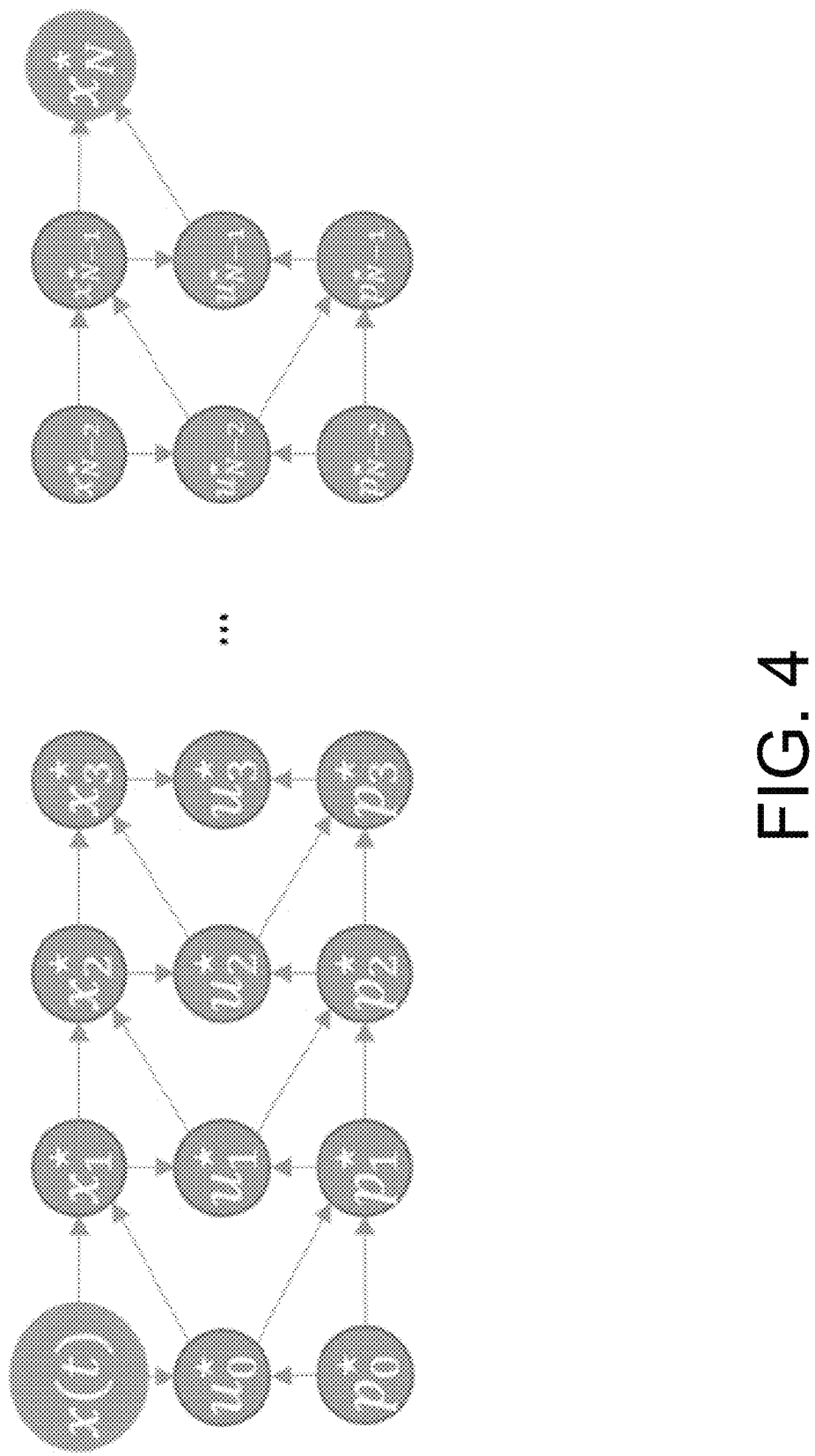
FIG. 4 illustrates an iterative process that may be followed to derive a final SOC given an initial SOC and initial co-state value.

Given a starting point SOC $x_0^*$, a starting co-state variable $p_0^*$, and a target SOC $x_N^*$ at an end time of a trip, FIG. 4 illustrates an iterative process that may be followed to derive target SOC $x_N^*$.

Figure 5A:
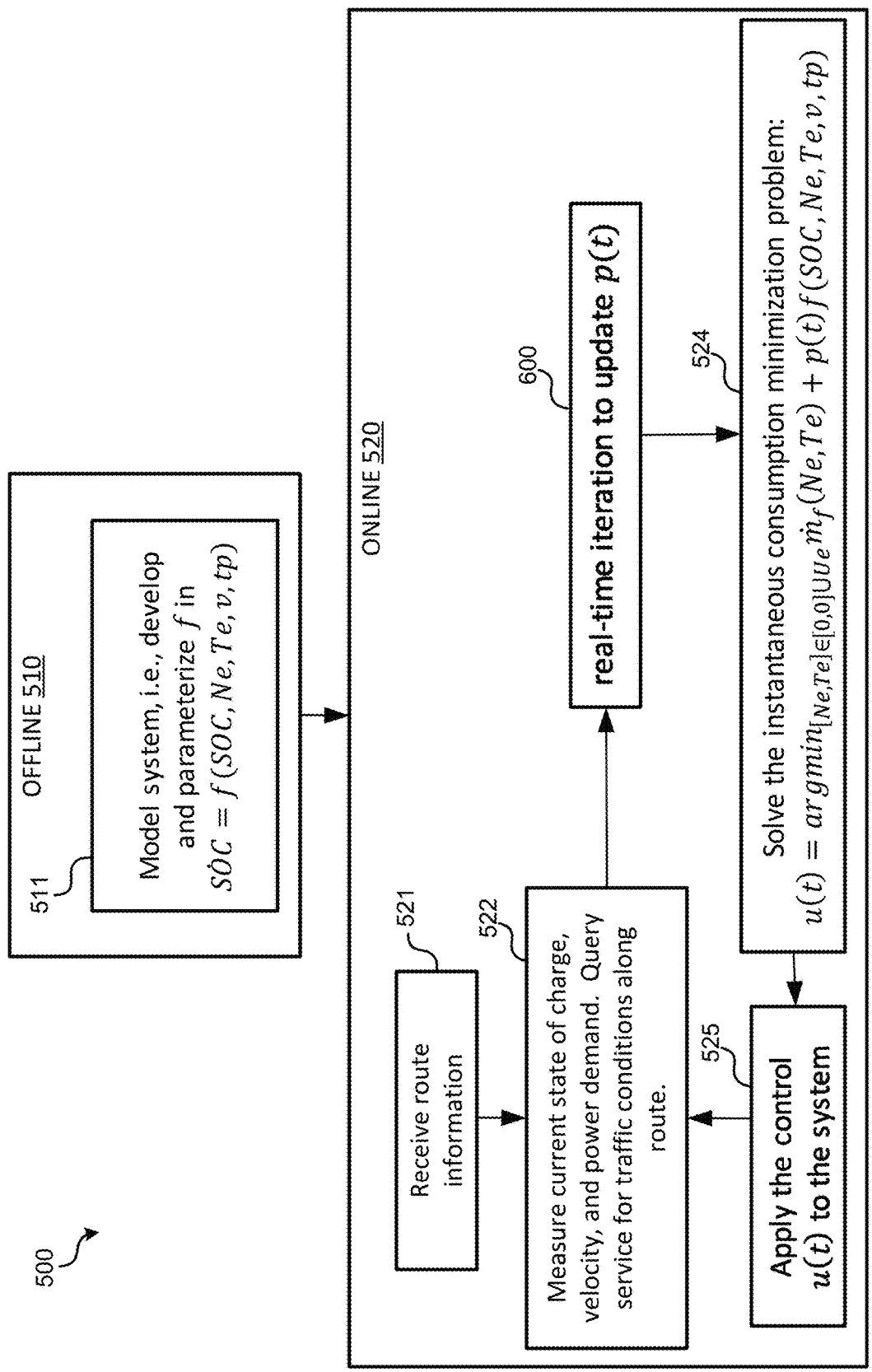
FIG. 5A is a block diagram illustrating a closed loop HEV and power split control system, in accordance with implementations of the disclosure.

FIG. 5A is a block diagram illustrating a particular mathematical implementation for implementing a real-time power split control in a HEV in accordance with implementations of the disclosure. In particular, FIG. 5A illustrates an implementation that utilizes the mathematical formulation of Equations (1)-(6). As illustrated, in an offline state 510 (e.g., prior to use of the real-time power split control), at block 511 a rate of change of battery SOC of the HEV may be modeled as a function of SOC, engine speed, engine torque, velocity, and torque demand.

In an online state 520 (e.g., during HEV travel), real-time power split control may be performed. At block 521, route information may be received. For example, block 521 may correspond to operation 202 of method 200. Thereafter, the real-time power split control loop may iterate. At block 522, a current SOC, velocity, and power demand may be measured. Additionally, a service may be queried for conditions along the route. Block 522 may correspond to operations 204-206 of method 200.

At block 600, a real-time iteration to update a co-state value p may be performed. At block 524, after updating the co-state value, an instantaneous consumption minimization problem, expressed by Equation (7), below, may be solved to update a control value for the current time sample t.

$$u(t)=\arg \min_{[Ne,Te]\in[0,0]U U_e} \dot{m}_f(Ne,Te)+p(t)f(SOC,Ne,Te,v,tp) \quad (7)$$

Block 524 may correspond to operation 210 of method 200.

At block 525, the updated control value may be applied to the power train of the HEV. Block 525 may correspond to operation 212 of method 200.

Figure 5B:
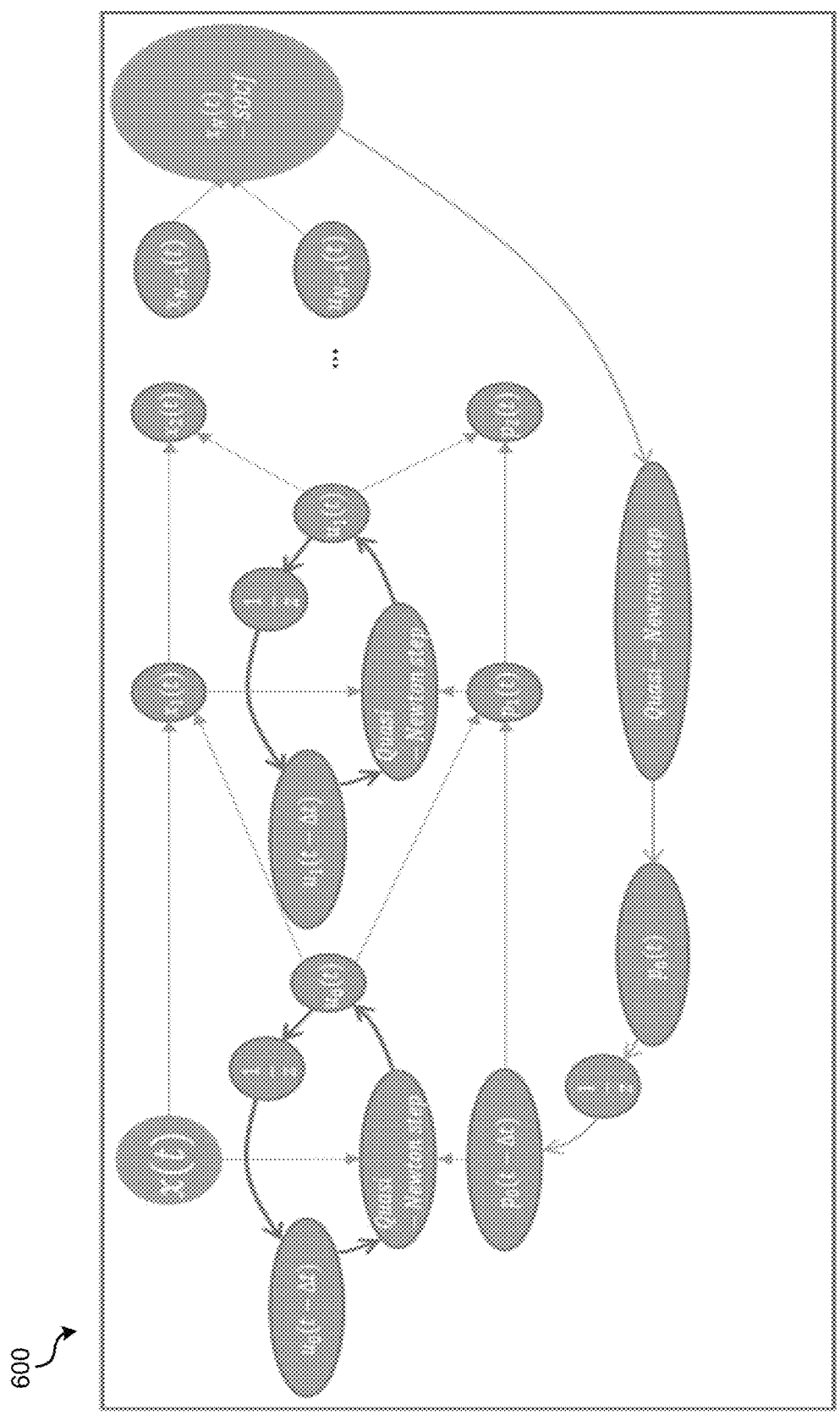
FIG. 5B is a flow diagram illustrating the block of FIG. 5A that performs a real-time iteration to update the co-state value of the power split control in the HEV.

FIG. 5B illustrates block 600. Block 600 is a flow diagram illustrating a real-time iteration process to update a co-state value. In the illustrated example, memory locations are denoted by 1/z. Block 600 may correspond to method 300.

Experimental Results

FIGS. 6A-6D are simulation results illustrating HEV fuel efficiency gains using a real-time power split control in accordance with implementations described herein (MPC) as contrasted with a conventional power split control (CDCS Rule Based).

Figure 6A:
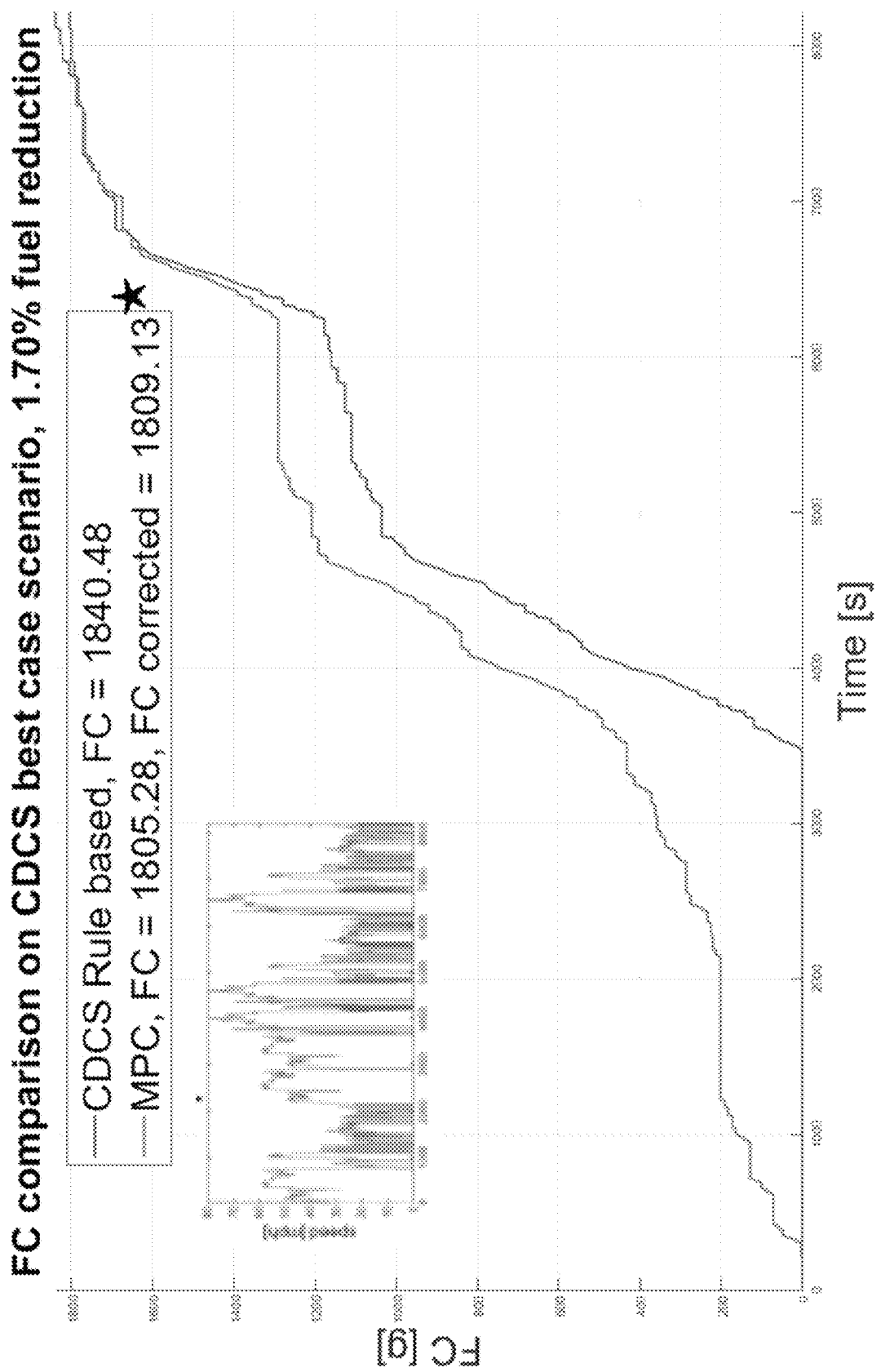
FIG. 6A illustrates fuel consumption as a function of time for a real-time power split control as compared with a best-case scenario of a conventional power split control.
Figure 6B:
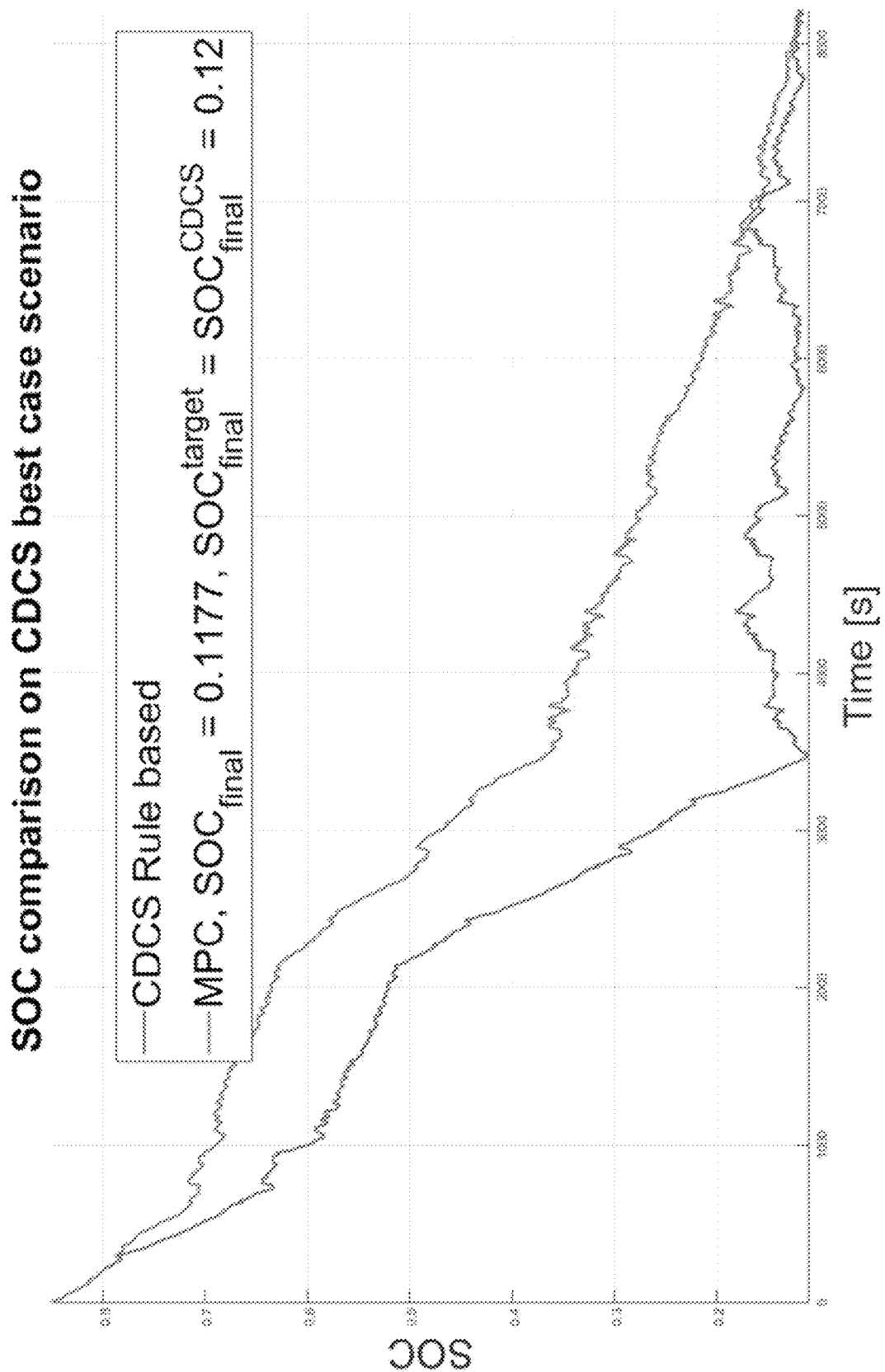
FIG. 6B illustrates SOC as a function of time for a real-time power split control as compared with a best-case scenario of a conventional power split control.

FIGS. 6A-6B illustrate a comparison of the real-time power split control with the best-case scenario of the conventional power split control. As illustrated by FIG. 6A, which shows fuel consumption as a function of time for each of the two controls, even in the best case scenario, fuel consumption was reduced by about 1.70% for the real-time power split control. FIG. 6B shows battery SOC as a function of time for each of the two controls.

Figure 6C:
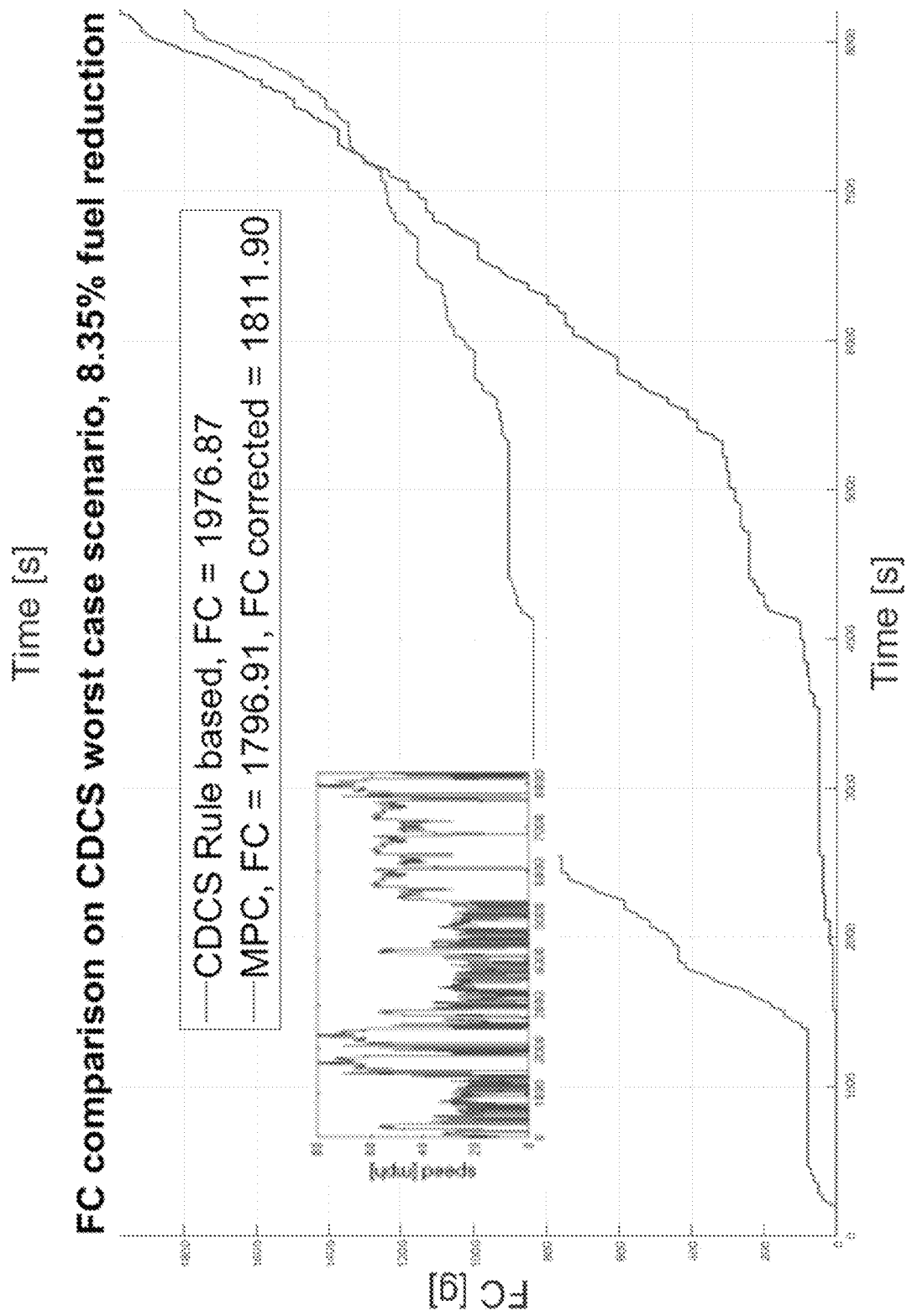
FIG. 6C illustrates fuel consumption as a function of time for a real-time power split control as compared with a worst-case scenario of a conventional power split control.
Figure 6D:
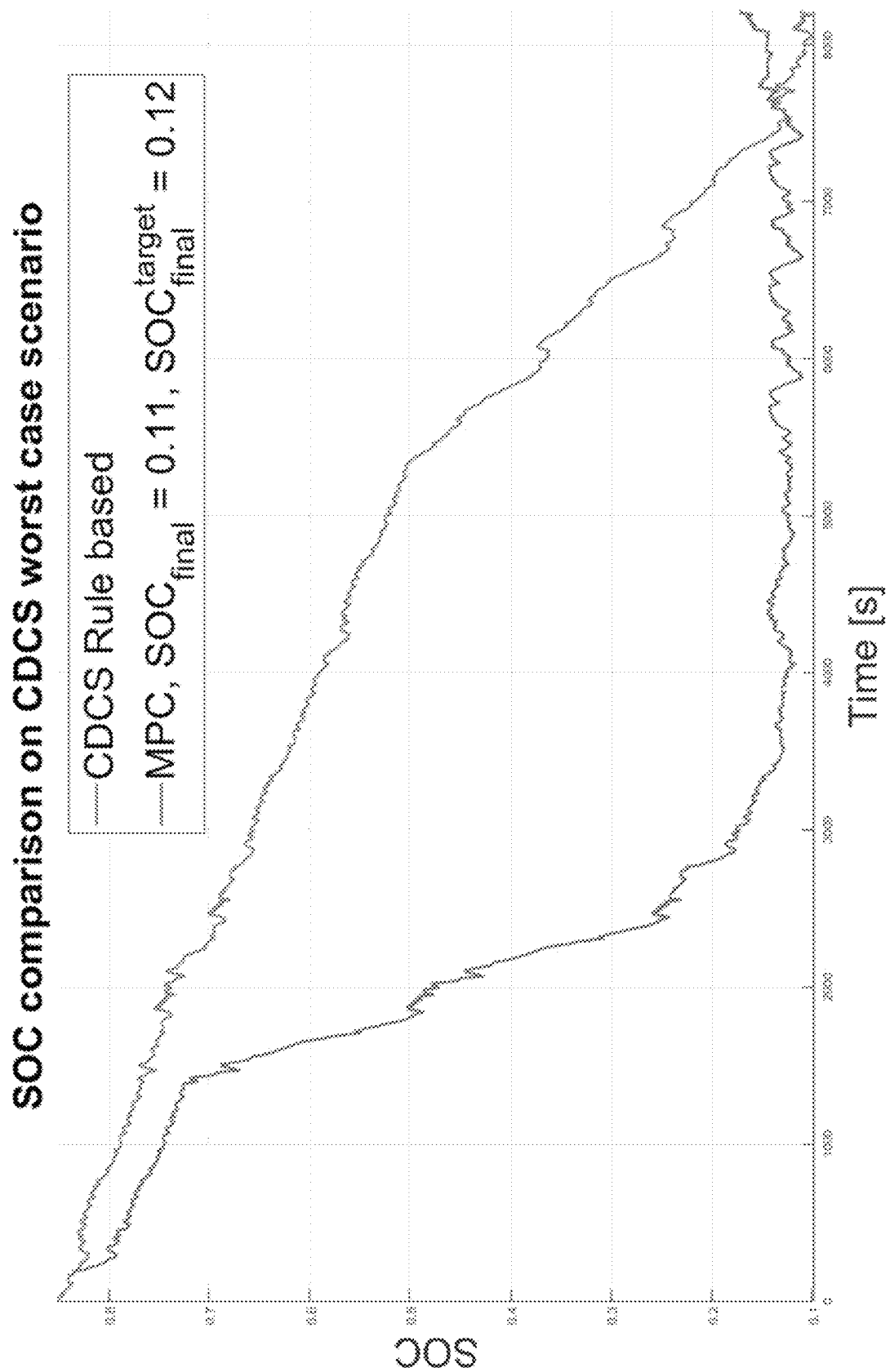
FIG. 6D illustrates SOC as a function of time for a real-time power split control as compared with a worst-case scenario of a conventional power split control.
Figure 7A:
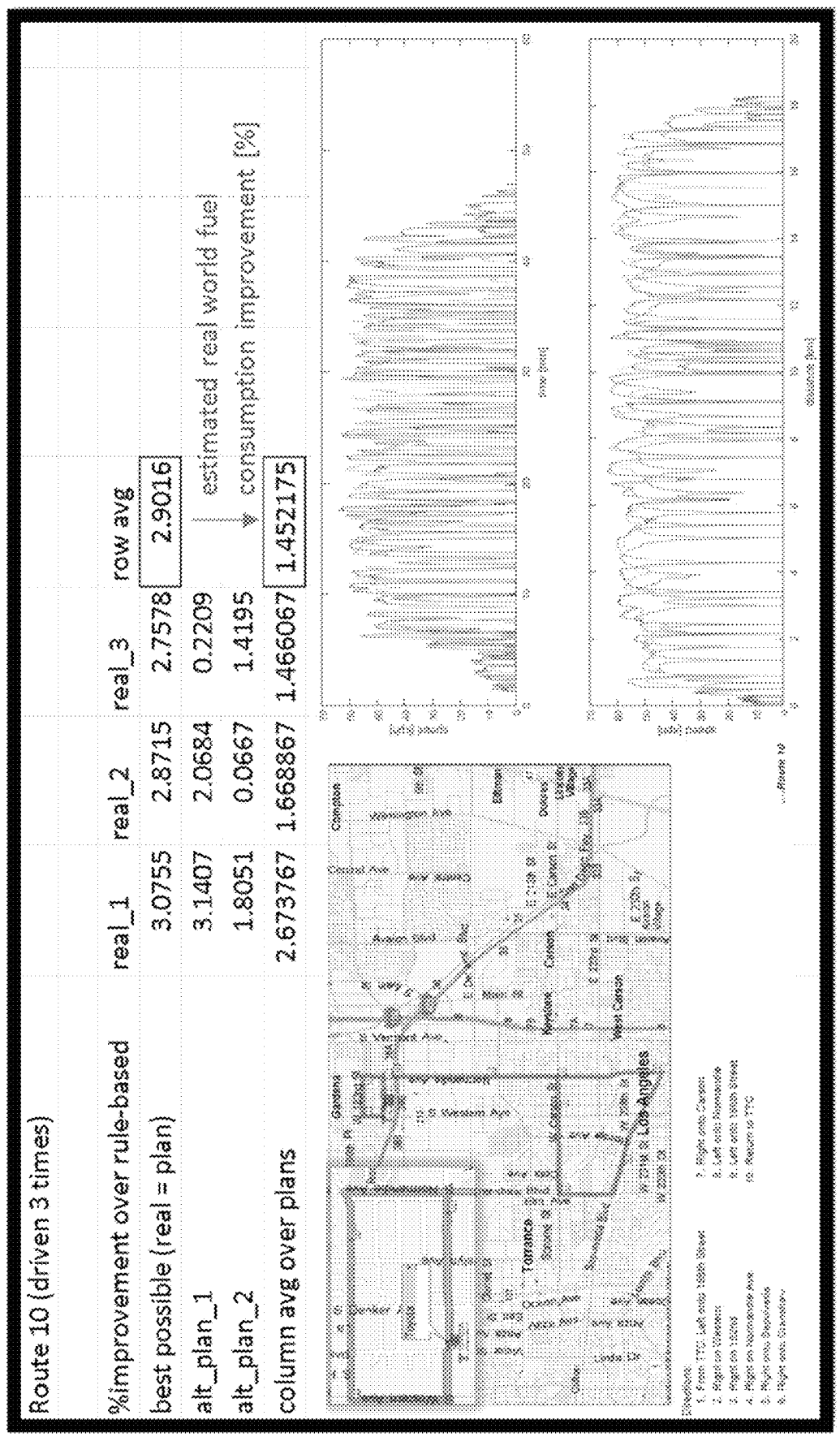
FIG. 7A shows a summary of an simulation result illustrating estimated real world fuel consumption improvement (as a %) for a route that were driven three times by a HEV implementing a power split control in accordance with the disclosure.
Figure 7B:
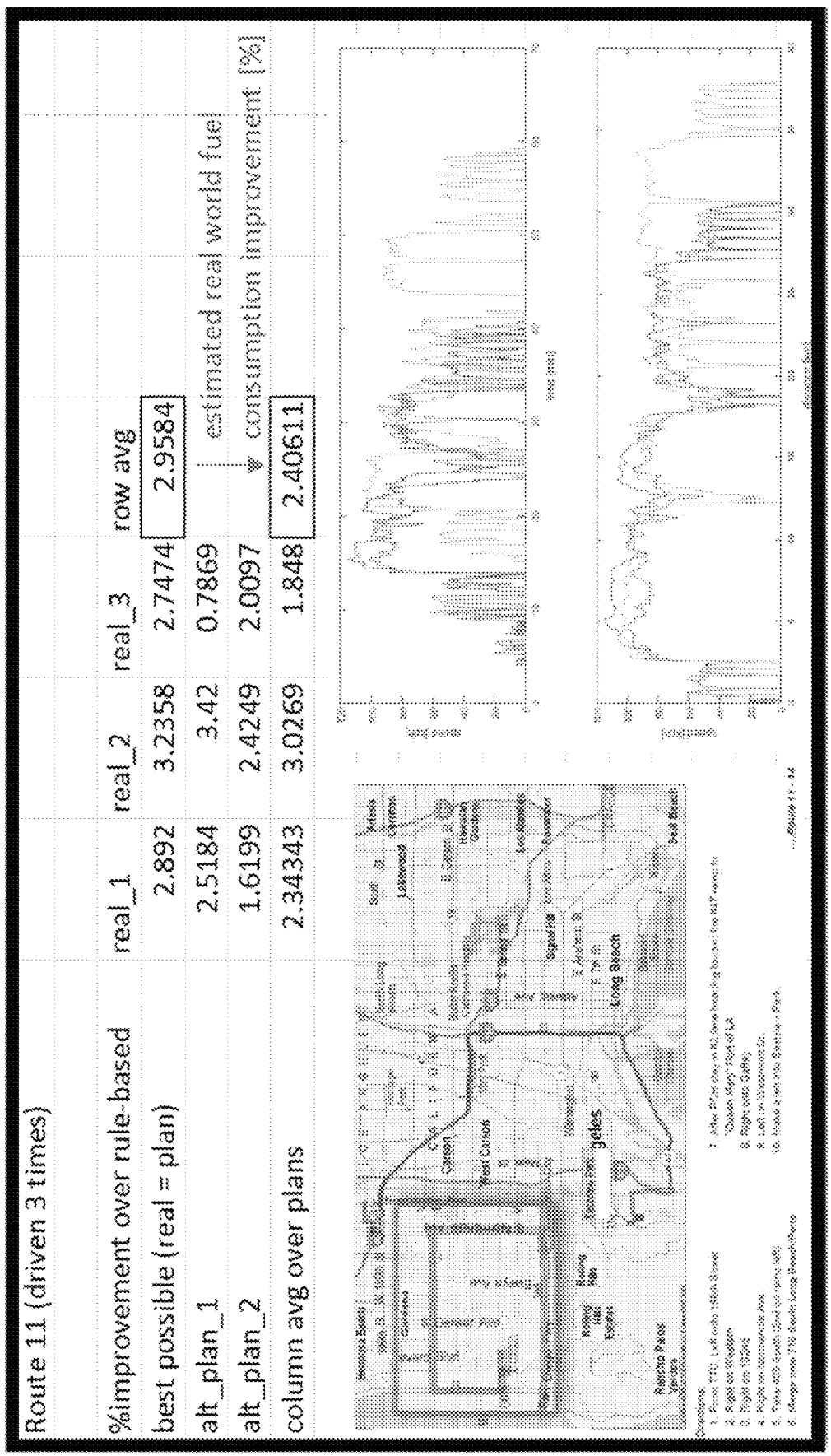
FIG. 7B shows a summary of an simulation result illustrating estimated real world fuel consumption improvement (as a %) for a route that were driven three times by a HEV implementing a power split control in accordance with the disclosure.
Figure 7C:
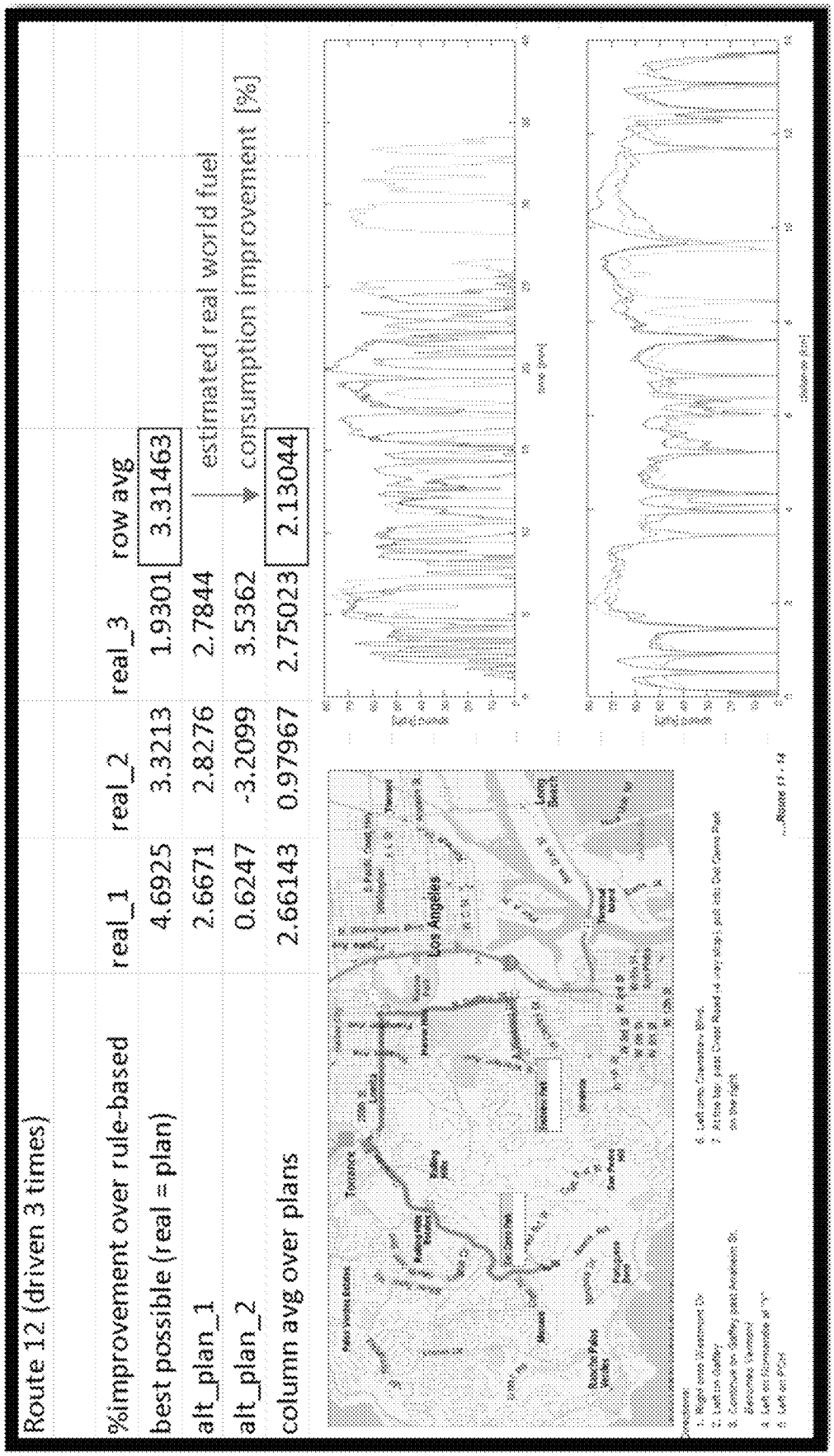
FIG. 7C shows a summary of an simulation result illustrating estimated real world fuel consumption improvement (as a %) for a route that were driven three times by a HEV implementing a power split control in accordance with the disclosure.
Figure 7D:
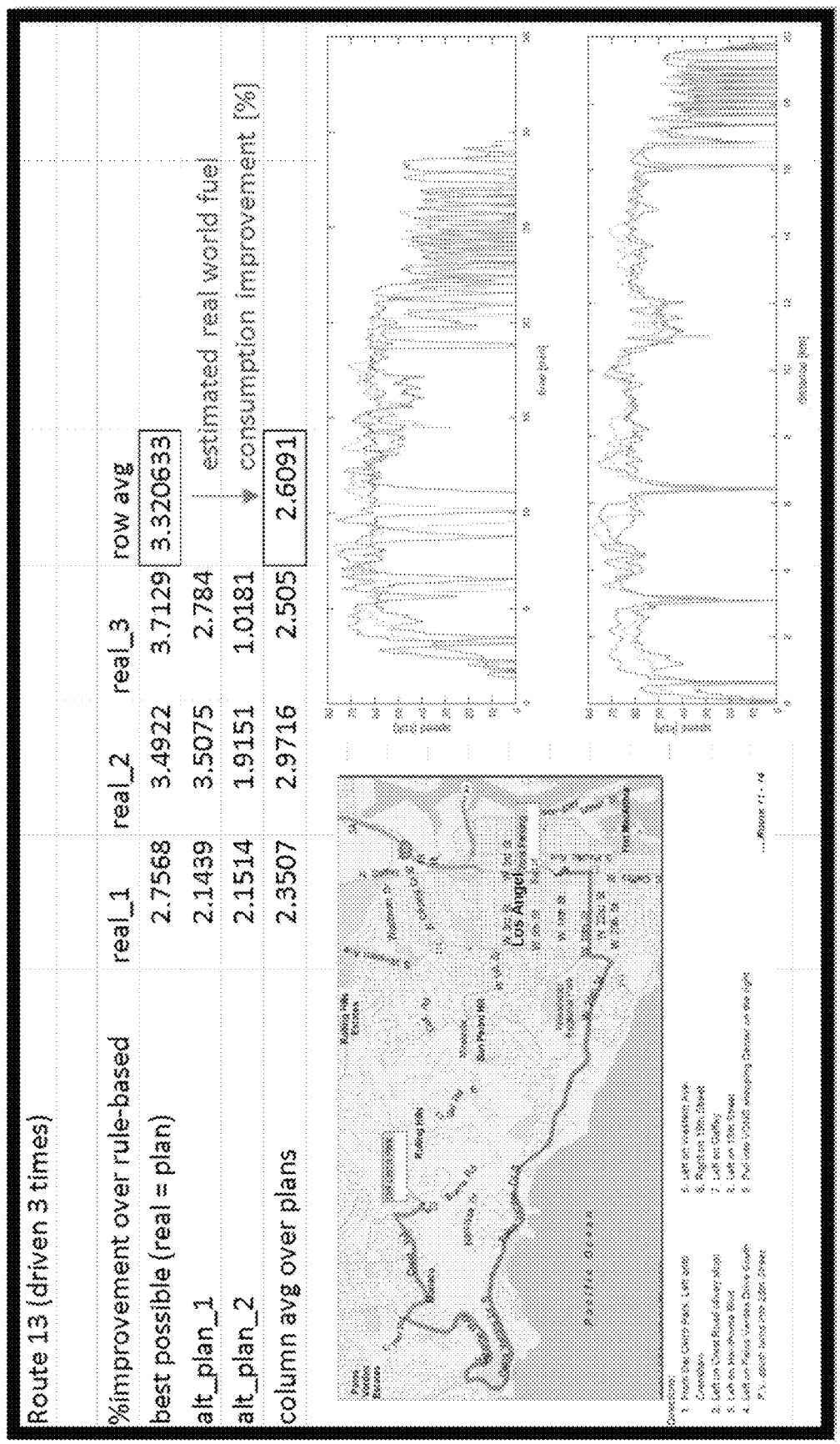
FIG. 7D shows a summary of an simulation result illustrating estimated real world fuel consumption improvement (as a %) for a route that were driven three times by a HEV implementing a power split control in accordance with the disclosure.

FIGS. 6C-6D illustrate a comparison of the real-time power split control with the worst-case scenario of the conventional power split control. As illustrated by FIG. 6C, which shows fuel consumption as a function of time for each of the two controls, in the worst case scenario, fuel consumption was reduced by about 8.35% for the real-time power split control. FIG. 6D shows battery SOC as a function of time for each of the two controls.

FIGS. 7A-7E are simulation results illustrating estimated real world fuel consumption improvement (as a %) for a variety of routes that were driven three times by a HEV implementing a power split control in accordance with the disclosure. As illustrated, on average, there was an estimated real world fuel consumption improvement of over 2%.

Figure 8:
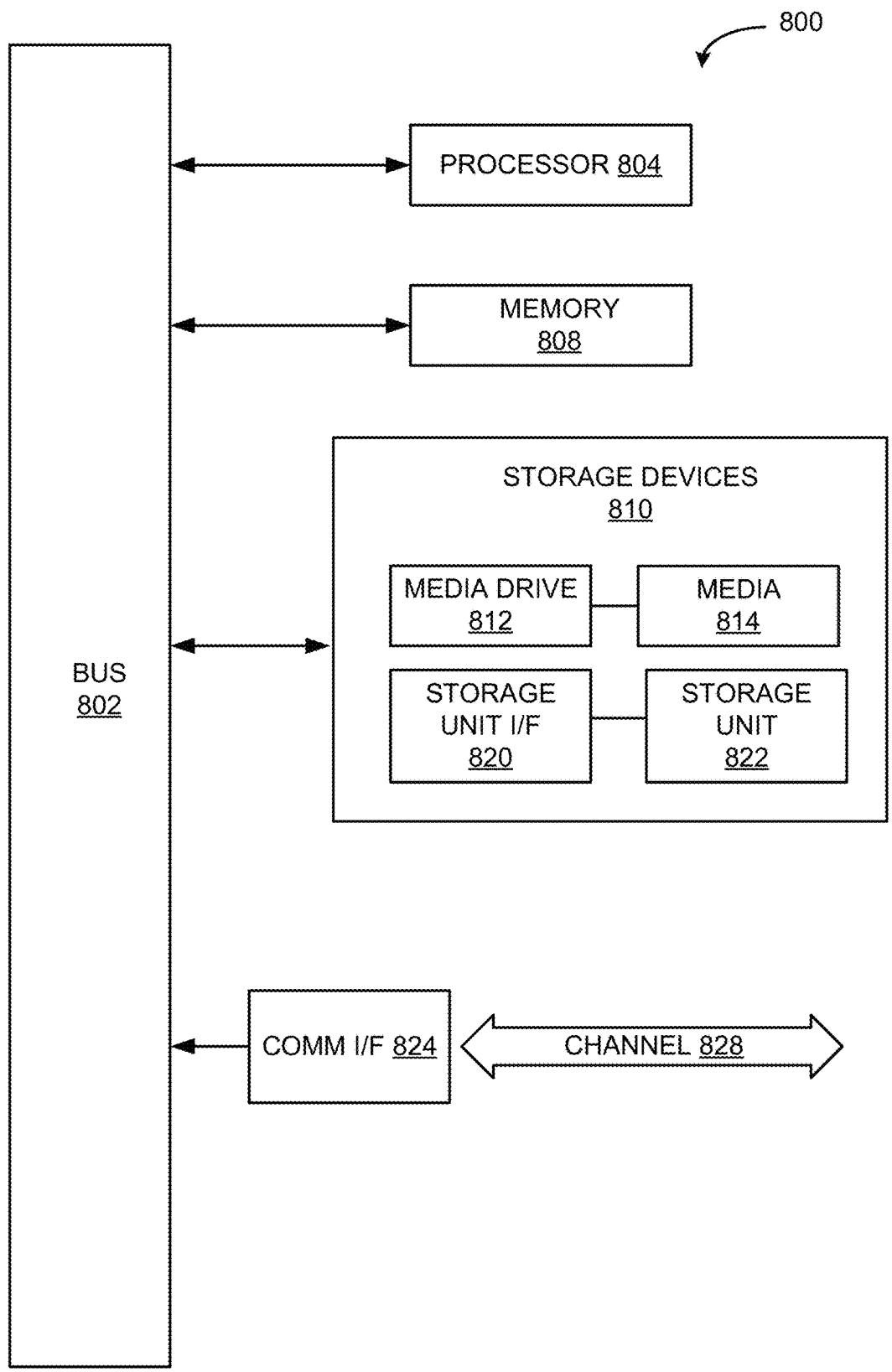
FIG. 8 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within computer processing units or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, electronic devices that might include some form of processing capability.

Computing component 800 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid state drive, a magnetic tape drive, an optical drive, a compact disc (CD), digital video disc (DVD) drive, or Blu-ray drive (R or RW), or other removable or fixed media drive might be provided. Storage media 814 might include, for example, a hard disk, a solid state drive, an integrated circuit assembly, magnetic tape, cartridge, optical disk, a CD, DVD, or Blu-ray. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 808, storage unit 820, and media 814. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A hybrid electric vehicle, comprising:
 an internal combustion engine;
 a battery;
 an electric motor operatively coupled to the battery; and
 an electronic control unit to:
  receive route information for a route to be driven by the hybrid electric vehicle; and
  after receiving the route information, iterating operations of:
   measuring a current state of charge (SOC) of the battery;
   using at least the measured SOC and an initial co-state value stored in a memory, performing a process to iteratively update the initial co-state value to obtain an updated co-state value;
   using at least the updated co-state value, computing an updated control value; and
   applying the updated control value to control a usage of the battery and the internal combustion engine.

2. The hybrid electric vehicle of claim 1, wherein performing the process to iteratively update the co-state value to obtain the updated co-state value, comprises further iteratively performing operations of:

using at least a current SOC, a current co-state value stored in a memory, and a control value stored in a memory, selecting a new control value;

storing the new control value in a memory;

using at least the current SOC and the new control value stored in memory, calculating a SOC one time step ahead in the future;

using at least the current SOC the new control value stored in memory, and a current co-state value, calculating a co-state value one time step ahead in the future; and setting the one time step ahead SOC and the one time step ahead co-state values as a current SOC and a current co-state value.

3. The hybrid electric vehicle of claim 2, wherein selecting the new control value comprises lowering a cost function of fuel consumption and battery SOC times the current co-state value.

4. The hybrid electric vehicle of claim 3, wherein performing the process to iteratively update the co-state value to obtain the updated co-state value, comprises: after iteratively performing the operations of selecting, storing, calculating, calculating, and setting, further performing operations of:

computing a difference between the current SOC with a minimum battery SOC;

choosing a new co-state initial value to reduce the difference; and replacing the co-state initial value stored in a memory with the new co-state initial value.

5. The hybrid electric vehicle of claim 2 wherein the operations of selecting, storing, calculating, calculating, and setting are iterated until the one time step ahead in the future reaches the expected end of the trip.

6. The hybrid electric vehicle of claim 1, wherein computing an updated control value comprises using at least the measured SOC and updated co-state value to compute a control value that minimizes a sum of a current fuel consumption rate and a rate-of-change of battery SOC times the updated co-state value.

7. The hybrid electric vehicle of claim 1, wherein the updated control value is to update the engine speed and the engine torque.

8. The hybrid electric vehicle of claim 7, wherein the electronic control unit is to measure a velocity and power demand each time the SOC of the battery is measured.

9. The hybrid electric vehicle of claim 8, wherein the electronic control unit is to measure traffic conditions prior to each time the co-state value is updated, wherein at least the measured current SOC, the initial co-state value stored in the memory, the measured velocity, the measured power demand, and the measured traffic conditions are used to update the co-state value.

10. A non-transitory computer-readable medium having executable instructions stored thereon that, when executed by a processor, cause the processor to perform operations of:

receiving route information for a route to be driven by a hybrid electric vehicle; and after receiving the route information, further iterating operations of:

measuring a current state of charge (SOC) of a battery of the hybrid electric vehicle;

using at least the measured SOC and an initial co-state value stored in a memory, performing a process to iteratively update the initial co-state value to obtain an updated co-state value;

using at least the updated co-state value, computing an updated control value; and applying the updated control value to control a usage of the battery and an internal combustion engine of the hybrid electric vehicle.

11. The non-transitory computer-readable medium of claim 10, wherein performing the process to iteratively update the co-state value to obtain the updated co-state value, comprises further iteratively performing operations of:

using at least a current SOC, a current co-state value stored in a memory, and a control value stored in a memory, selecting a new control value;

storing the new control value in a memory;

using at least the current SOC and the new control value stored in memory, calculating a SOC one time step ahead in the future;

using at least the current SOC the new control value stored in memory, and a current co-state value, calculating a co-state value one time step ahead in the future; and setting the one time step ahead SOC and the one time step ahead co-state values as a current SOC and a current co-state value.

12. The non-transitory computer-readable medium of claim 11, wherein selecting the new control value comprises lowering a cost function of fuel consumption and battery SOC times the current co-state value.

13. The non-transitory computer-readable medium of claim 12, wherein performing the process to iteratively update the co-state value to obtain the updated co-state value, comprises: after iteratively performing the operations of selecting, storing, calculating, calculating, and setting, further performing operations of:

computing a difference between the current SOC with a minimum battery SOC;

choosing a new co-state initial value to reduce the difference; and replacing the co-state initial value stored in a memory with the new co-state initial value.

14. The non-transitory computer-readable medium of claim 11, wherein the operations of selecting, storing, calculating, calculating, and setting are iterated until the one time step ahead in the future reaches the expected end of the trip.

15. The non-transitory computer-readable medium of claim 10, wherein computing an updated control value comprises using at least the measured SOC and updated co-state value to compute a control value that minimizes a sum of a current fuel consumption rate and a rate-of-change of battery SOC times the updated co-state value.

16. The non-transitory computer-readable medium of claim 10, wherein the updated control value is to update the engine speed and the engine torque.

17. The non-transitory computer-readable medium of claim 16, wherein the instructions when executed by the processor, cause the processor to further perform an operation of: measuring a velocity and power demand each time the SOC of the battery is measured.

18. The non-transitory computer-readable medium of claim 17, wherein the instructions when executed by the processor, cause the processor to further perform an operation of: measuring traffic conditions prior to each time the co-state value is updated, wherein at least the measured current SOC, the initial co-state value stored in the memory, the measured velocity, the measured power demand, and the measured traffic conditions are used to update the co-state value.

19. A method, comprising:
- receiving route information for a route to be driven by a hybrid electric vehicle; and
- after receiving the route information, further iterating operations of:
  - measuring a current state of charge (SOC) of a battery of the hybrid electric vehicle;
  - using at least the measured SOC and an initial co-state value stored in a memory, performing a process to iteratively update the initial co-state value to obtain an updated co-state value;
  - using at least the updated co-state value, computing an updated control value; and
  - applying the updated control value to control a usage of the battery and an internal combustion engine of the hybrid electric vehicle.

20. The method of claim 19, wherein performing the process to iteratively update the co-state value to obtain the updated co-state value, comprises further iteratively performing operations of:
- using at least a current SOC, a current co-state value stored in a memory, and a control value stored in a memory, selecting a new control value;
- storing the new control value in a memory;
- using at least the current SOC and the new control value stored in memory, calculating a SOC one time step ahead in the future;
- using at least the current SOC the new control value stored in memory, and a current co-state value, calculating a co-state value one time step ahead in the future; and
- setting the one time step ahead SOC and the one time step ahead co-state values as a current SOC and a current co-state value.

* * * * *